US008345270B2

(12) United States Patent
Fukutani et al.

(10) Patent No.: US 8,345,270 B2

(45) Date of Patent: Jan. 1, 2013

(54) PRINT DATA GENERATION APPARATUS AND COMPUTER-READABLE MEDIUM STORING PRINT DATA GENERATION PROGRAM

(75) Inventors: Mai Fukutani, Anjo (JP); Tomoki Miyashita, Nagoya (JP); Minako Ishida, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 505 days.

(21) Appl. No.: 12/383,153

(22) Filed: Mar. 20, 2009

(65) Prior Publication Data

US 2009/0244603 A1 Oct. 1, 2009

(30) Foreign Application Priority Data

Mar. 26, 2008 (JP) ................................ 2008-079723

(51) Int. Cl.
*G06K 15/02* (2006.01)

(52) U.S. Cl. ..................................... 358/1.11; 358/1.18

(58) Field of Classification Search ........................ None
See application file for complete search history.

(56) References Cited

U.S. PATENT DOCUMENTS

| | | | | |
|---|---|---|---|---|
| 7,503,711 | B2 * | 3/2009 | Arkin | 400/76 |
| 2007/0136665 | A1 * | 6/2007 | Stuple et al. | 715/531 |
| 2008/0014001 | A1 | 1/2008 | Horii | |

FOREIGN PATENT DOCUMENTS

| | | | |
|---|---|---|---|
| JP | 5346947 | | 12/1993 |
| JP | 3767563 | | 9/2003 |
| JP | 3108090 | U | 4/2005 |
| JP | 2006-328118 | A | 12/2006 |

OTHER PUBLICATIONS

Office Action; Chinese Application No. 2009-10132433.1; Dated: Mar. 26, 2012.

* cited by examiner

*Primary Examiner* — Kimberly A Williams
*Assistant Examiner* — John Wallace
(74) *Attorney, Agent, or Firm* — McCarter & English, LLP

(57) ABSTRACT

A print data generation apparatus generates print data to be used for printing a print result including a plurality of lines on a tape-shaped print medium. The print data generation apparatus includes an input device that inputs a plurality of character strings for the plurality of lines to be printed on the print medium, a storage device that stores the plurality of character strings for the plurality of lines, and a print data generation device that generates the print data in which each of the plurality of character strings are repeatedly arranged in a predetermined character size defined for each of the plurality of lines and at predetermined spacing in each of the plurality of lines until the print result reaches a predetermined length.

6 Claims, 15 Drawing Sheets

PRINT DATA GENERATION APPARATUS AND COMPUTER-READABLE MEDIUM STORING PRINT DATA GENERATION PROGRAM

CROSS-REFERENCE TO RELATED APPLICATION

This application claims priority to Japanese Patent Application No. 2008-079723, filed Mar. 26, 2008, the disclosure of which is hereby incorporated by reference in its entirety.

BACKGROUND

The present disclosure relates to a print data generation apparatus and a computer-readable medium storing a print data generation program.

Conventionally, as disclosed in Japanese Patent No. 3767563, a printing apparatus that performs printing on a tape-like print medium (hereinafter referred to as a "tape") is known. This type of printing apparatus will be hereinafter referred to as a "tape printing apparatus". Some printing apparatuses may generate print data itself to perform printing. Other printing apparatuses may be connected to another apparatus such as a personal computer that generates print data, receive the print data and perform printing. When print data is generated, a user may edit a print target by arranging the print target at desired print position on a print medium. The print target may be a character string and an illustration, for example. By using a character string processing apparatus described in Japanese Patent Application Laid-Open Publication No. Hei 5-346947, the user can edit the print-target character string to be aligned at the "left", "center", or "right", if a text direction of the character string is horizontal. The user can also edit the character string to be aligned at the "top", "center", and "bottom", if the text direction is vertical.

Further, if the user wishes to align and print multiple character strings with a tape printing apparatus, the user may need print data for the aligned multiple character strings. In such a case, the user may need to enter the character string as many times as a desired number of repetitions into an apparatus that generates print data for printing by the tape printing apparatus. Such type of apparatus may conventionally have a function referred to as "copy-and-print". The copy-and-print function refers to a function to generate print data for a specified number of repeated character strings aligned at a predetermined intervals. Further, the tape printing apparatus may have a function referred to as "repeat printing". The repeat printing function refers to a function to use the same print data to print a character string a specified number of times to repeat printing. By using the repeat printing function, the same character string may be printed a plurality of number of times, and a print result with a plurality of the aligned same character strings may be obtained.

Further, conventionally, an adhesive material may be applied to a back surface of a tape, which is opposite to a printing surface of the tape. Therefore, printed tapes may be stuck to a variety of goods and used. For example, a tape having a name printed thereon may be stuck on a stationery product such as scissors to be used.

SUMMARY

In a case where the tape having the name printed thereon is stuck on the stationery product, the name may stand out too much while the stationery product is in use. The name printed on the tape may be useful for someone who found the stationery product left by the user and tries to find the owner. In other words, the name may be of no use when the owner is using the stationery product ordinarily. Given this factor, in order to prevent the name from being emphasized too much, characters of the name to be printed may be decorated sometimes. One type of decoration may be a designed list of the repeated names. In such a case, the conventional print data generation apparatus for the conventional tape printing apparatus may cost the user time to enter the characters and edit them.

Further, in a case where the same character strings are arranged repeatedly for decoration, the use of the repeat printing function may not always bring a desired result for the user. For example, relatively wide spacing may be required between the consecutive character strings for tape feeding. In another case where a result of printing includes a plurality of lines, character strings in the respective lines may have different lengths, corresponding to the number of characters or the size thereof. Therefore, the character strings may not be aligned in a well-balanced manner in some cases. For example, a case may be considered here, in which a print result includes two lines of character strings, the character string in the first line has three characters, the character string in the second line has 10 characters, and the characters each have the same size. In such a case, the use of copy-and-print function or repeat printing function may result in a poor balance, because spacing between the character strings in the first line may be wider by seven characters than the spacing in the second line.

Various exemplary embodiments of the general principles herein provide a print data generation apparatus that generates print data to print decorative print results with simple entering operation and a computer-readable medium storing a print data generation program.

Exemplary embodiments provide a print data generation apparatus that generates print data to be used for printing a print result including a plurality of lines on a tape-shaped print medium. The print data generation apparatus includes an input device, a storage device, and a print data generation device. The input device inputs a plurality of character strings to be printed on the print medium, wherein each of the plurality of character strings is input for each of the plurality of lines. The storage device stores the plurality of character strings input through the input device, wherein each of the plurality of character strings is stored for each of the plurality of lines. The print data generation device generates the print data in which each of the plurality of character strings stored in the storage device are repeatedly arranged in a predetermined character size defined for each of the plurality of lines and at predetermined spacing in each of the plurality of lines until the print result reaches a predetermined length.

Exemplary embodiments also provide a computer-readable medium storing a print data generation program. The print data generation program includes instructions to cause a computer to execute the steps of accepting a plurality of character strings to be printed in a plurality of lines on a tape-shaped print medium, wherein each of the plurality of character strings is input for each of the plurality of lines, storing each of the plurality of character strings for each of the plurality of lines, and generating print data in which each of the plurality of character strings are repeatedly arranged in a predetermined character size defined for each of the plurality of lines and at predetermined spacing in each of the plurality of lines until a print result including the plurality of lines reaches a predetermined length.

BRIEF DESCRIPTION OF THE DRAWINGS

Exemplary embodiments of the present disclosure will be described below in detail with reference to the accompanying drawings in which.

DETAILED DESCRIPTION OF THE EXEMPLARY EMBODIMENTS

An exemplary embodiment will be described below with reference to the drawings. These drawings will be used to explain technological features that can be employed in the present disclosure, and configurations of apparatuses and flowcharts of various processing described herein are just illustrative and not intended to be restrictive.

Figure 1:
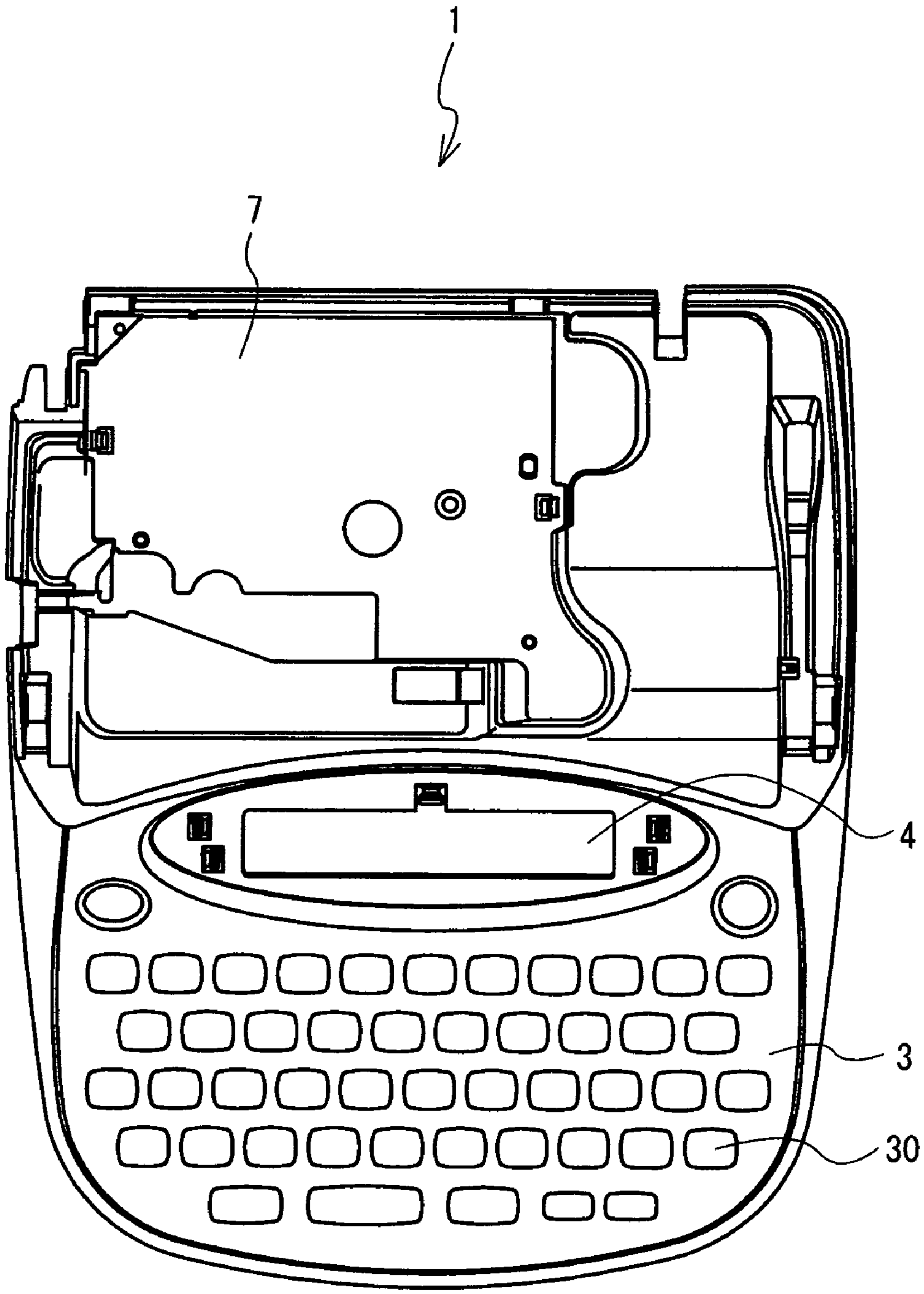
FIG. 1 is a plan view of a tape printing apparatus in a condition where a lid of a cassette housing portion has been removed.

A physical configuration of a tape printing apparatus 1 will be described below with reference to FIG. 1. As shown in FIG. 1, the tape printing apparatus 1 includes a cassette housing 7 at a rear portion (upper part in FIG. 1) and a keyboard portion 3 at a front portion (lower part in FIG. 1). The cassette housing 7 is a concave portion to house a known tape cassette (not shown) containing a wound tape serving as a print medium. The keyboard portion 3 has a plurality of keys 30 arranged thereon. The keys 30 may include character keys and function keys for entering various commands. The character keys may include, for example, keys for entering alphabets, Japanese HIRAGANA characters, Japanese KATAKANA characters, numeric characters, symbols, etc. The function keys may include, for example, a PRINT key, a CANCEL key, etc. Further, the tape printing apparatus 1 includes a liquid crystal display (LCD) 4 between the cassette housing 7 and the keyboard portion 3. The LCD 4 may display characters entered via the keyboard portion 3 as a print target, as well as setting items and options for various kinds of setting.

Figure 2:
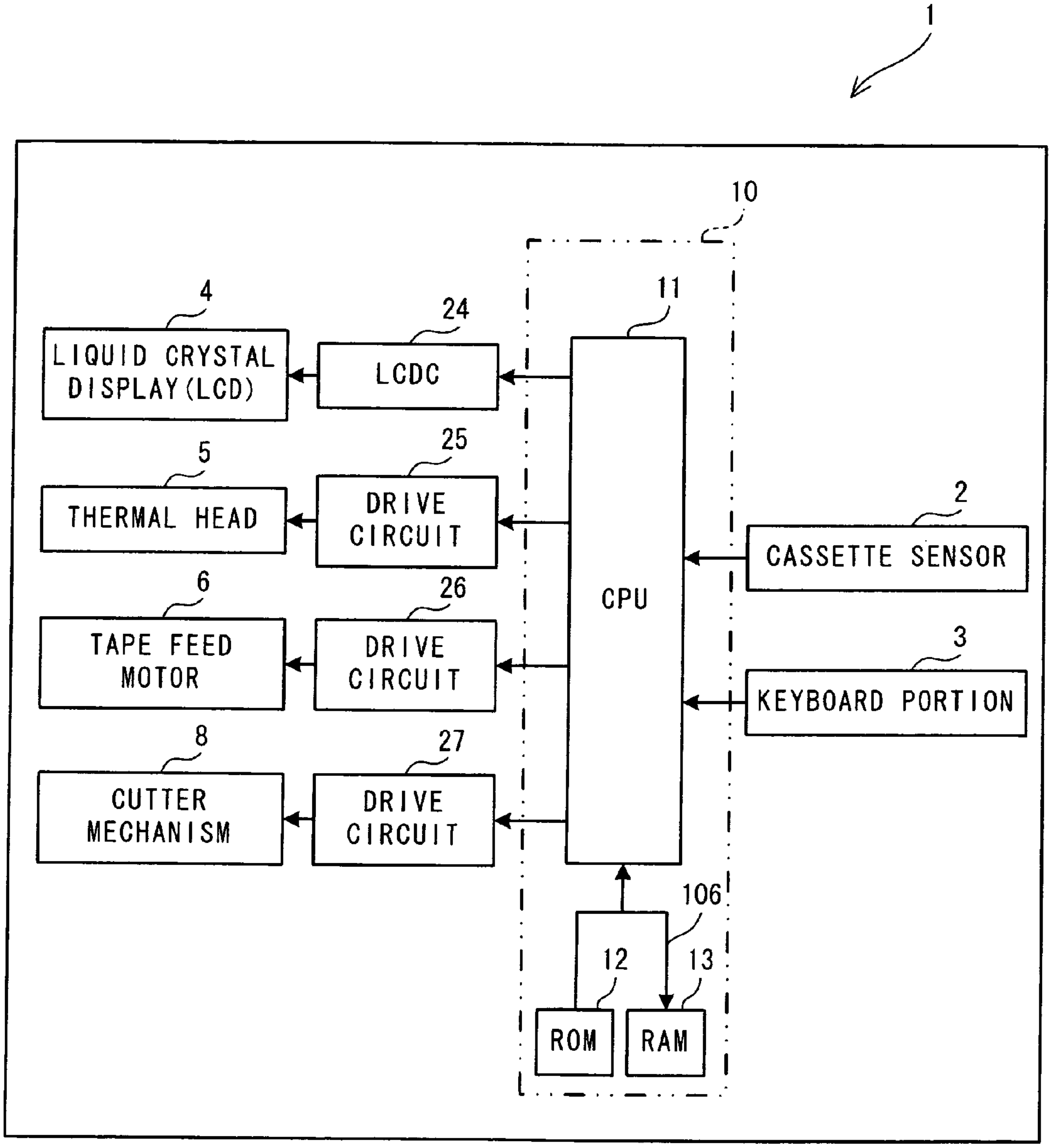
FIG. 2 is a block diagram of an electrical configuration of the tape printing apparatus.

Next, an electrical configuration of the tape printing apparatus 1 will be described below with reference to FIG. 2. As shown in FIG. 2, a control system of the tape printing apparatus 1 is configured such that a control circuit portion 10 as a nucleus is formed on a control board. The control circuit portion 10 includes a CPU 11, a ROM 12, and a RAM 13, which are connected to each other via a bus 106. A cassette sensor 2 to detect a tape cassette, the keyboard portion 3, a liquid crystal display controller (hereinafter referred to as "LCDC") 24, and drive circuits 25 to 27 are each connected to the CPU 11. The LCDC 24, which is connected to the LCD 4, has a video RAM (not shown) to output display data to the LCD 4. The drive circuit 25 drives a thermal head 5. The drive circuit 26 drives a tape feed motor 6. The drive circuit 27 drives a cutter mechanism 8 to cut off a tape.

In the tape printing apparatus 1, the thermal head 5 is disposed in a tape width direction of the wound tape contained in the tape cassette. The tape printing apparatus 1 prints one line of information in the tape width direction by the thermal head 5 and then feeds the printed tape by one line of distance using the tape feed motor 6. Each time printing and feeding are repeated, one line of information is printed on the tape.

Figure 3:
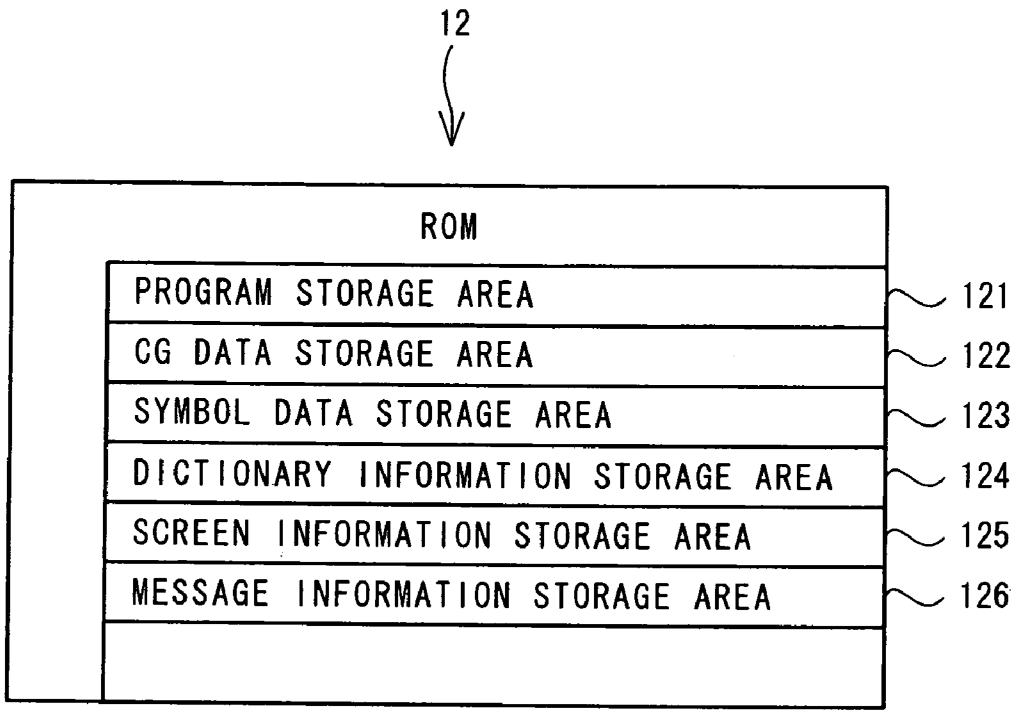
FIG. 3 is an explanatory diagram of an example of a configuration of a ROM.

Next, storage areas that may be arranged in the ROM 12 and-the RAM 13 in the tape printing apparatus 1 will be described with reference to FIGS. 3 and 4. As shown in FIG. 3, the ROM 12 may have, for example, a program storage area 121, a CG data storage area 122, a symbol data storage area 123, a dictionary information storage area 124, a screen information storage area 125, and a message information storage area 126. The ROM 12 may have other storage areas that are not shown.

The program storage area 121 stores a display drive control program, a print drive control program, a print data generation program, and other various programs required to control the tape printing apparatus 1. The display drive control program is used to control the LCDC 24 in accordance with code data of characters entered through the keyboard portion 3. The print drive control program is used to drive the thermal head 5 and the tape feed motor 6 by reading data stored in a print buffer 131 (see FIG. 4). The print data generation program is used to generate print data required to adjust the number of characters or block lines and print them, in accordance with the width of the tape, which is a print medium.

The CG data storage area 122 stores dot data for various sizes of characters and symbols that can be entered through the keyboard portion 3. The symbol data storage area 123 stores dot data for graphics and illustrations. The dictionary information storage area 124 stores information of a dictionary required for Kanji conversion. The screen information storage area 125 stores forms of screens to be displayed on the LCD 4. The message information storage area 126 stores messages to be displayed on the LCD 4.

Figure 4:
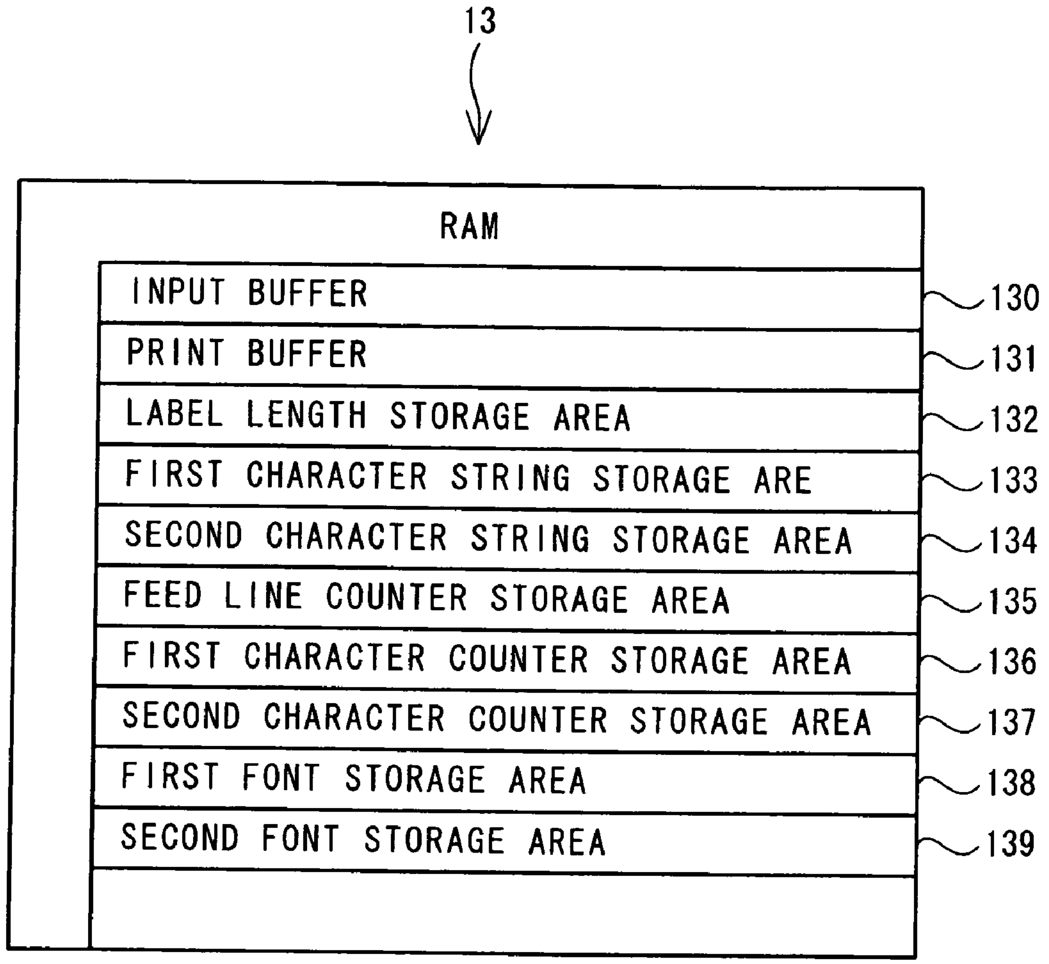
FIG. 4 is an explanatory diagram of an example of a configuration of a RAM.

As shown in FIG. 4, the RAM 13 has an input buffer 130, the print buffer 131, a label length storage area 132, a first character string storage area 133, a second character string storage area 134, a feed line counter storage area 135, a first character counter storage area 136, a second character counter storage area 137, a first font storage area 138, and a second font storage area 139. The RAM 13 may have other storage areas that are not shown.

The input buffer 130 stores information inputted via the keyboard 3 as a print target. The input information may include, for example, characters, information about characters, and a line feed. The information about characters may include, for example, a font size and a font type. The print buffer 131 stores information required to drive the thermal head 5 for printing. The print buffer 131 may store, for example, dot patterns for printing and the number of pulses to be applied, which is the level of energy required to form each of the dots.

The label length storage area 132 stores a length by which printing is to be performed on the label. This length will be hereinafter referred to as a "label length". The first character string storage area 133 stores a character string to be printed in the first line. The second character string storage area 134 stores a character string to be printed in the second line. The feed line counter storage area 135 stores a counter (Line) that is used to count feed lines. It should be noted that a feed line does not refer to the first or second line in a format, but refers to a line by which the tape is fed by the tape feed motor 6. The first character counter storage area 136 stores a counter (Cnt1) that is used to count characters of the character string in the first line when the print data is generated. The second character counter storage area 137 stores a counter (Cnt2) that is used to count characters of the character string in the second line when the print data is generated. The first font storage area 138 stores the font of the characters in the first line when the print data is generated. The second font storage area 139 stores the font of the characters in the second line when the print data is generated.

Figure 5:
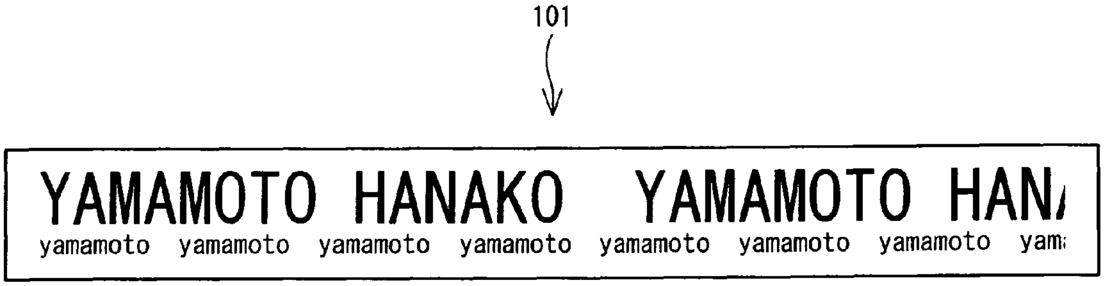
FIG. 5 is a schematic illustration of an example of print results.
Figure 6:
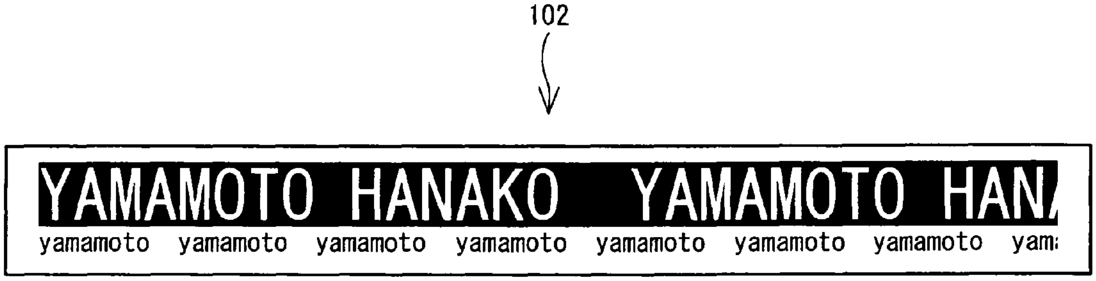
FIG. 6 is a schematic illustration of another example of the print results.
Figure 7:
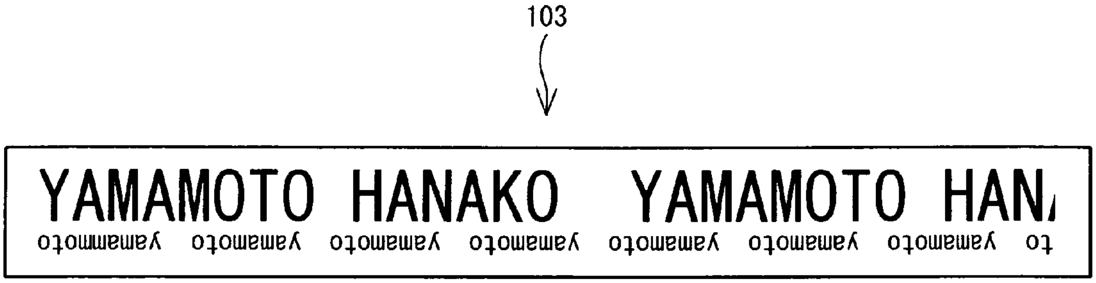
FIG. 7 is a schematic illustration of a further example of the printing results.

Next, print results that can be provided by the tape printing apparatus 1, which also serves as a print data generation apparatus, will be described with reference to FIGS. 5 to 7. As shown in FIGS. 5 to 7, print results 101 to 103 each include character strings printed in two lines. A character string "YAMAMOTO HANAKO" in uppercase is repeatedly printed in the first line, and another character string "yamamoto" in lowercase is repeatedly printed in the second line. In the print result 101, the first line is printed in a larger font size than the second line. In the print result 102, the first line of the print result 101 is printed highlighted. In the print result 103, the second line of the print result 101 is printed as rotated by 180 degrees. In the present embodiment, an example in which the character strings are printed in two lines will be described. A plurality of formats is prepared beforehand for the tape printing apparatus 1. In each of the formats, a font type, a font size, and a decoration (highlight, rotation, boldface, etc.) are set for the character string in each line. Hereinafter, the font type, the font size, and the decoration are collectively referred to as "character attributes". Further, the print results 101 through 103 respectively shown in FIGS. 5 to 7 are each referred to as a "decorative label", and a format for printing a decorative label is referred to as a "decorative label format".

The user may select a decorative label format and enter character strings to be printed in the first line and the second line, respectively The tape printing apparatus 1 may repeatedly print each line of the character strings entered by the user based on the character attributes defined for each line in the decorative label format. It should be noted that even if the respective lengths of the print results of the character strings in the first and second lines are different from each other owing to the numbers of the characters or the character attributes, the character strings are aligned repeatedly in the respective lines without being influenced by the other line. Thus, in the examples shown in FIG. 5 to 7, the lowercase character string "yamamoto" in the second line is not influenced by the position where the uppercase character string "YAMAMOTO HANAKO" is repeated in the first line.

Figure 8:
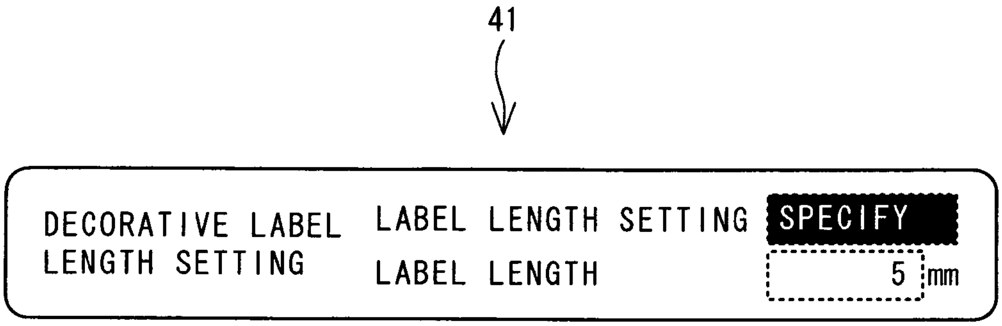
FIG. 8 is a schematic illustration of a decorative label length setting screen.

Next, a screen displayed on the LCD 4 when a decorative label is printed will be described with reference to FIGS. 8 to 10. As shown in FIG. 8, a decorative label length setting screen 41 may have a "Label length setting" field to select whether to specify a label length, and a "Label length" field to specify a label length if the label length is to be specified. In the "Label length setting" field, the user may select either of the options, "Specify" or "Not Specify". In the "Label length" field, the user may specify the label length in millimeter units. In the present embodiment, if "Specify" is selected in the "Label length setting" field, a decorative label having a length specified in the "Label length" field may be created. If "Not Specify" is selected in the "Label length setting" field, the length of the print result of the character string in the first line and the length of the print result of the character string in the second line may be compared. Then, whichever larger in comparison may be determined as a label length.

Figure 9:
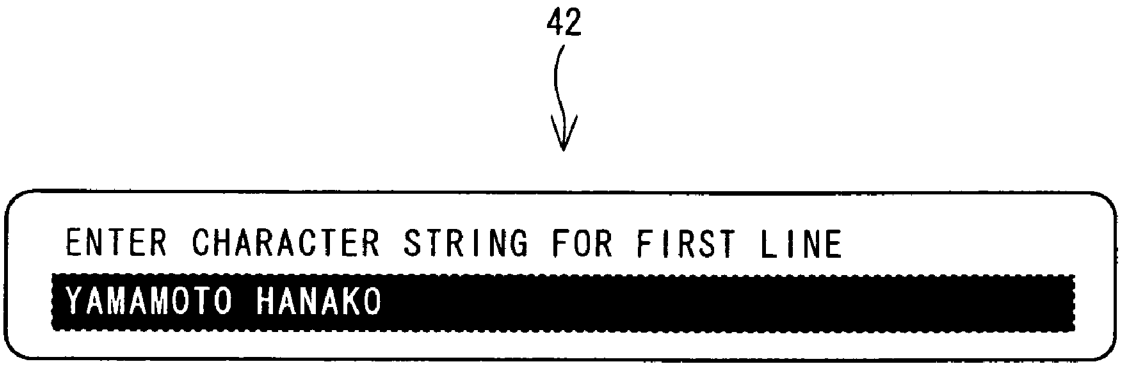
FIG. 9 is a schematic illustration of a first-line character string entry screen.
Figure 10:
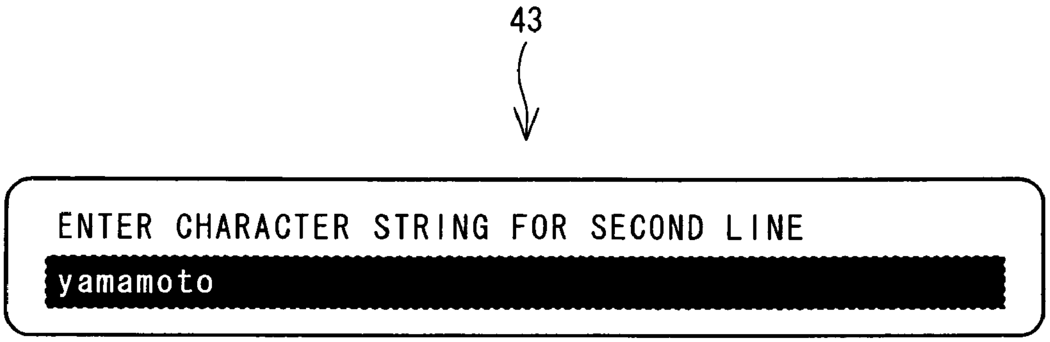
FIG. 10 is a schematic illustration of a second-line character string entry screen.

As shown in FIG. 9, a first line character string entry screen 42 may include a message "ENTER CHARACTER STRING FOR FIRST LINE" and an entry field to enter the character string. Similarly, as shown in FIG. 10, a second line character string entry screen 43 may include a message of "ENTER CHARACTER STRING FOR SECOND LINE" and an entry field to enter the character string.

Next, decorative label processing for printing a decorative label will be described below, with reference to FIGS. 11 to 15. The decorative label processing starts if an instruction to execute a "decorative label" function is given through operations by the user on the keyboard portion 3. A description will be given below, using an example where a character string in the first line is "YAMAMOTO HANAKO" in uppercase and a character string in the second line is "yamamoto" in lowercase. In the example, the number of the uppercase characters in the first line is fifteen (15) and the number of the lowercase characters in the second line is eight (8).

First, a decorative label format selection screen (not shown) to select a decorative label format is displayed on the LCD 4, and a selection entered by the user is accepted (S1). A selected format is stored in a predetermined storage area (not shown) of the RAM 13. The decorative label length setting screen 41 shown in FIG. 8 is displayed on the LCD 4. On the decorative label length setting screen 41, the user may select whether to specify or not to specify a label length. Further, in a case where a label length is to be set, a value of the label length is set (S2).

Subsequently, the first line character string entry screen 42 shown in FIG. 9 is displayed, and entry of a character string to be printed in the first line is accepted (S3). The input character string is stored in the first character string storage area 133 (S4). Subsequently, the second line character string entry screen 43 shown in FIG. 10 is displayed, and entry of a character string to be printed in the second line is accepted (S5). The input character string is stored in the second character string storage area 133 (S6). Then, it is determined whether the label length is to be specified (S7). If "Specify" has been selected in the "Label length Setting" field on the decorative label length setting screen 41, it is determined that the label length is to be specified (YES at S7). Then the value specified in the "Label length" field on the decorative label length setting screen 41 is converted into a number of dots and then stored in the label length storage area 132 of the RAM 13 (S8). For example, a calculation ratio of 10 dots/mm may be used. In such case, if a label length of 50 mm is specified, the number of 500 is stored.

If "Specify" has not been selected in the "Label length Setting" field on the decorative label length setting screen 41 (NO at S7), the label length will be set based on the character strings in the first and second lines and the selected decorative label format (S9, S10). Specifically, a length (a number of dots) to be required for a generated font (dot data) of the character string in the first line is calculated, based on the character attributes of the first line in the selected decorative label format (S9). Similarly, a length to be required for a generated font for the character string in the second line is also calculated, based on the character attributes of the second line in the selected decorative label format (S9). Then, the two lengths are compared, and the one with a larger length is selected and stored as a label length in the label length storage area 132 (S10).

Figure 12:
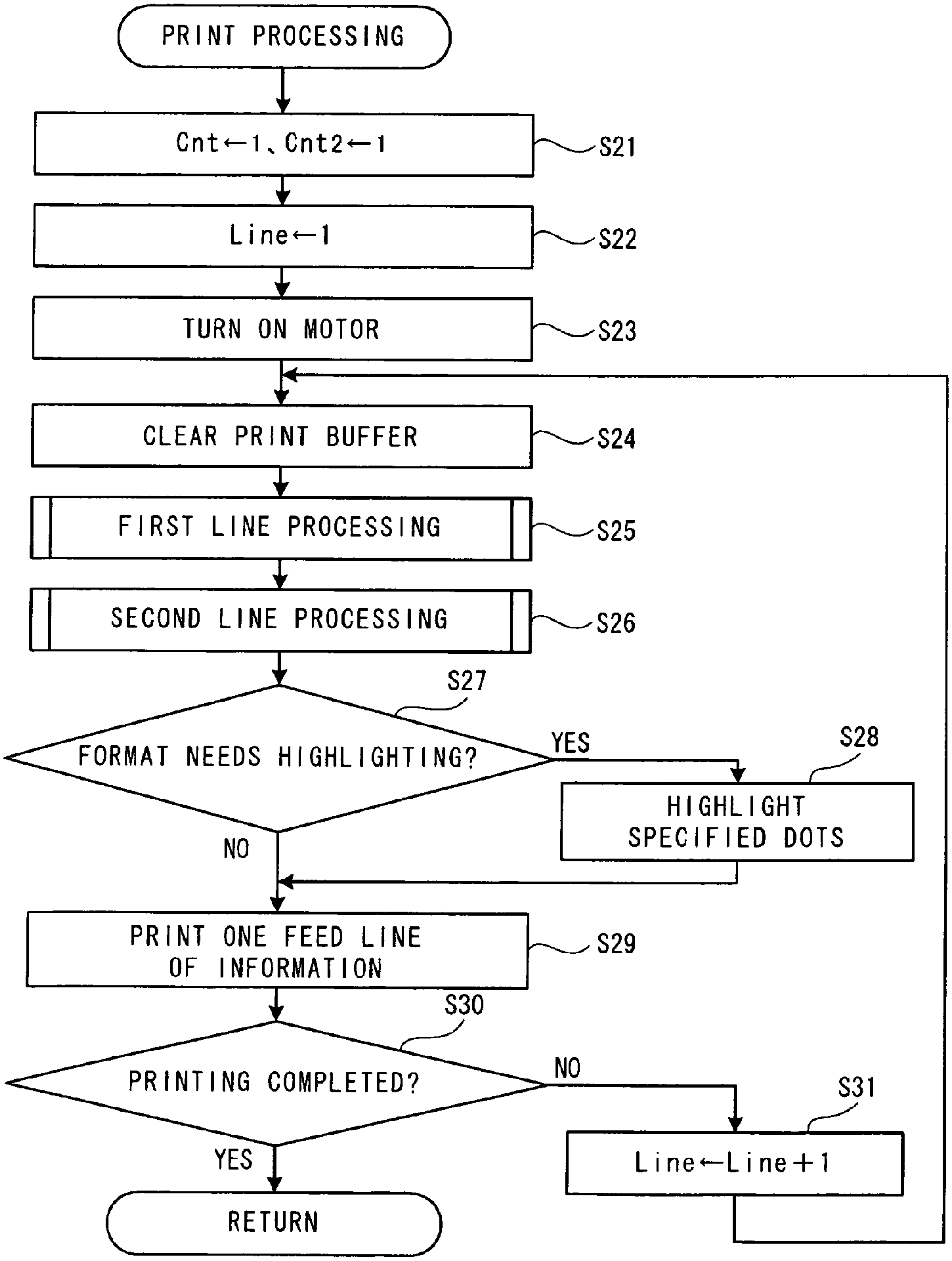
FIG. 12 is a flowchart of printing processing performed in the decorative label processing.

Subsequently, print processing is performed (S11 and FIG. 12). As shown in FIG. 12, first, an initial value one (1) is stored as variable Cnt1 that is used to count the characters of the character string in the first line (S21). In addition, an initial value one (1) is stored as variable Cnt2 that is used to count the characters of the character string in the second line (S21). An initial value one (1) is stored as variable Line that is used to count feed lines (S22). Subsequently, the tape feed motor 6 is turned ON (S23). The print buffer 131 is cleared (S24) to perform the first (1st) line processing (S25 and FIG. 13) and the second (2nd) line processing (S26 and FIG. 14). In the first line processing and the second line processing, a dot pattern of a feed line indicated by variable Line is extracted for each line and stored in the print buffer 131.

Figure 13:
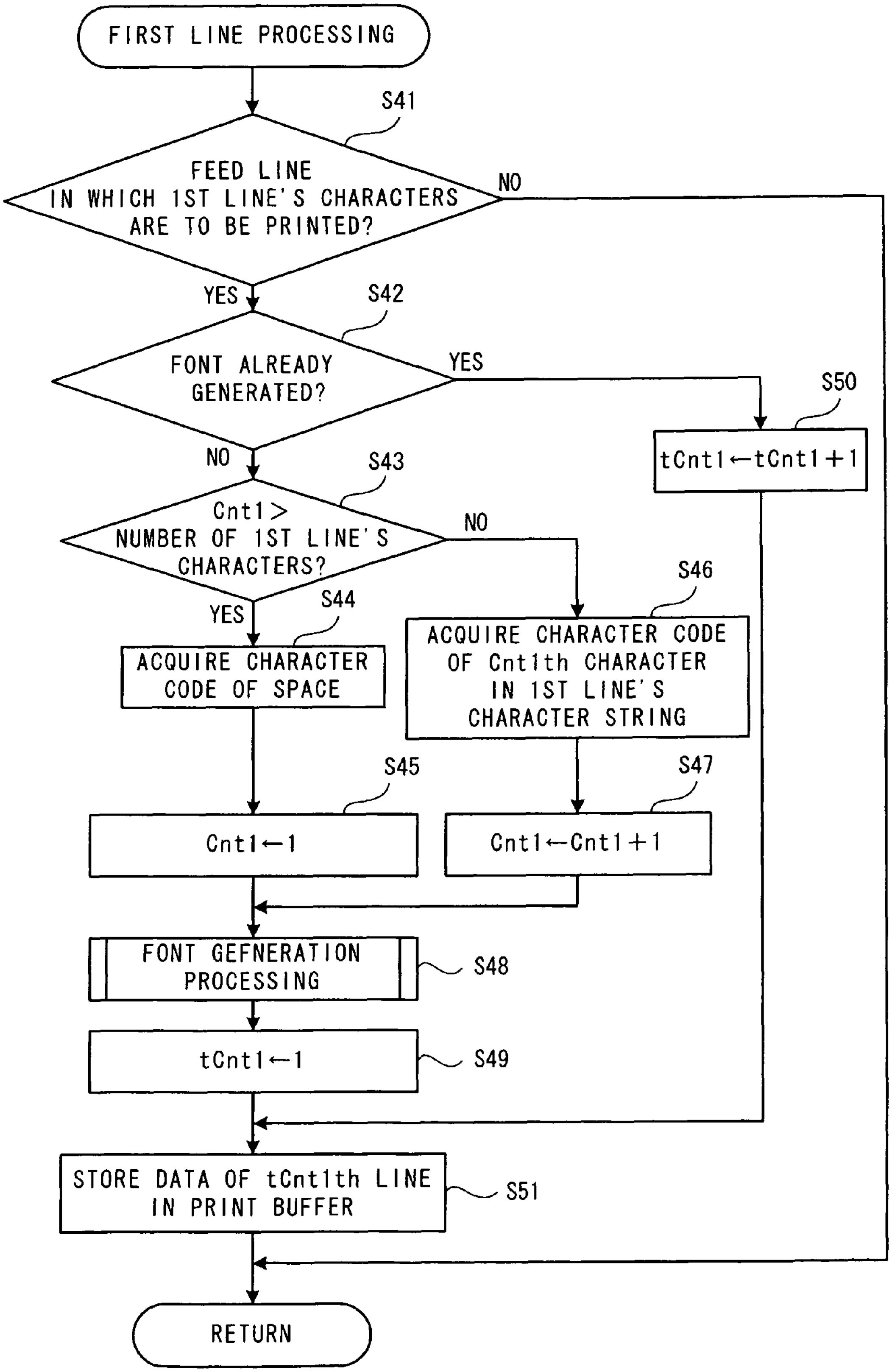
FIG. 13 is a flowchart of first-line processing performed in the printing processing.

As shown in FIG. 13, in the first line processing, first, it is determined whether the current feed line is a feed line in which the first line's characters are to be printed (S41). On a decorative label, a blank space will be provided at the beginning and the end of printing. If the current feed line is a feed line that corresponds to the blank space, the character string in the first line is not to be printed. In such a case, it is determined that the current feed line is not a feed line in which the first line's characters are to be printed (NO at S41). The number of the feed lines included in the blank space may be predetermined for each decorative label format. If a feed line indicated by variable Line, that is, first line in this case, is included in the blank space and, therefore, is not a feed line in which the first line's characters are to be printed (NO at S41), the present processing is ended. Accordingly, information to give an instruction of printing is not stored at a position corresponding to the first line in the print buffer 131.

Figure 14:
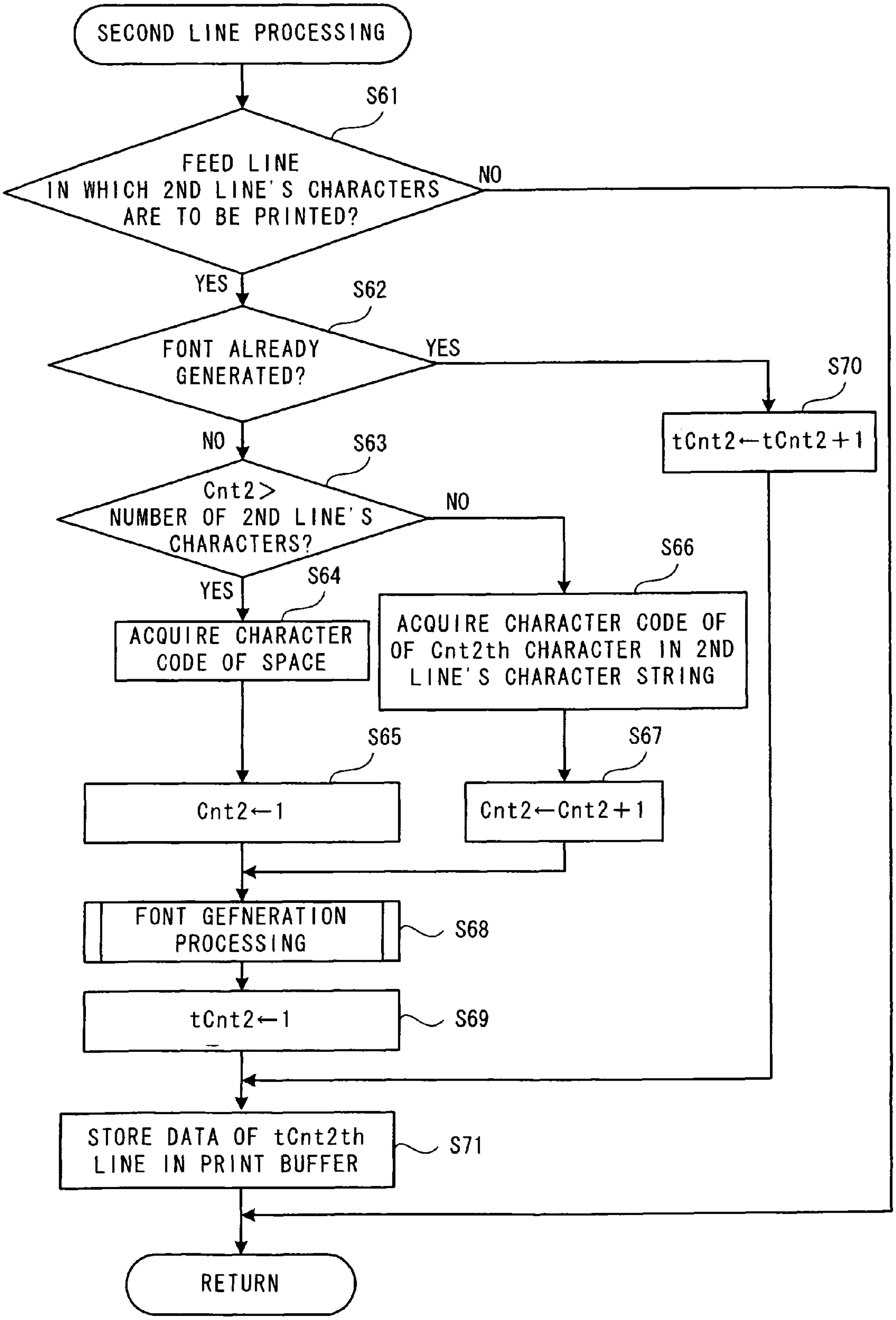
FIG. 14 is a flowchart of second-line processing performed in the printing processing.

Subsequently, as shown in FIG. 14, in the second line processing, like the first line processing, it is determined whether the current feed line is a feed line in which the second line's characters are to be printed (S61). If a feed line indicated by variable Line, that is, first line in this case, is not a feed line in which the second line's characters are to be printed (NO at S61), the present processing is ended. Accordingly, information to give an instruction of printing is not stored at a position corresponding to the second line in the print buffer 131.

Subsequently, the processing returns to the print processing shown in FIG. 12, to determine whether the selected decorative label format needs highlighting (S27). If the format needs highlighting (for example, the format for obtaining the print result 102 shown in FIG. 6) (YES at S27), among the information pieces stored in the print buffer 131, specified dots are highlighted (S28). Specifically, the dots to which pulses are to be applied from the thermal head 5 are changed into the dots to which no pulses are to be applied. The dots to which no pulses are to be applied are changed into the dots to which the pulses are to be applied. Then, based on the information stored in the print buffer 131, printing for one feed line is performed (S29). At this point, after one feed line is printed by the thermal head 5, the tape is fed by an amount of one feed line by the tape feed motor 6.

Then, it is determined whether the printing has been completed based on whether the number of feed lines indicated by variable Line is larger than the label length (S30). Here, because variable Line is 1, it is determined that the printing has not been completed yet (NO at S30). Accordingly, 1 is added to variable Line to provide 2 (S31) and the processing returns to step S24. Then, the processing of steps S24 through S31 is repeated.

After the processing on the feed lines included in the blank space at the beginning is ended through the repeated processing of steps S24 through S31, the following processing will be performed in the first line processing of step S25. First, it is determined that the current feed line is a feed line in which the first line's characters are to be printed (YES at S41 in FIG. 13). Subsequently, it is determined whether a font of the first line's characters has already been generated (S42). Immediately after the processing on the feed lines included in the blank space, no font has been generated and stored in the first font storage area 138 (NO at S42). Then, it is determined whether variable Cnt1 for counting the characters of the first line's character string is larger than the number of the characters in the first line (S43). Here, because variable Cnt1 is 1 (Cnt1=1), variable Cnt1 is not larger than the number of the characters in the first line, that is, 15 (NO at S43). Therefore, a character code of the Cnt1*th* character as counted from the first of the character string in the first line (S46). In this case, because variable Cnt1 is 1 (Cnt1=1), a character code for the uppercase "Y", which is the first character in the first line, is acquired. A value 1 is added to Cnt1 to provide 2 (S47), and font generation processing is performed (S48 and FIG. 15).

Figure 15:
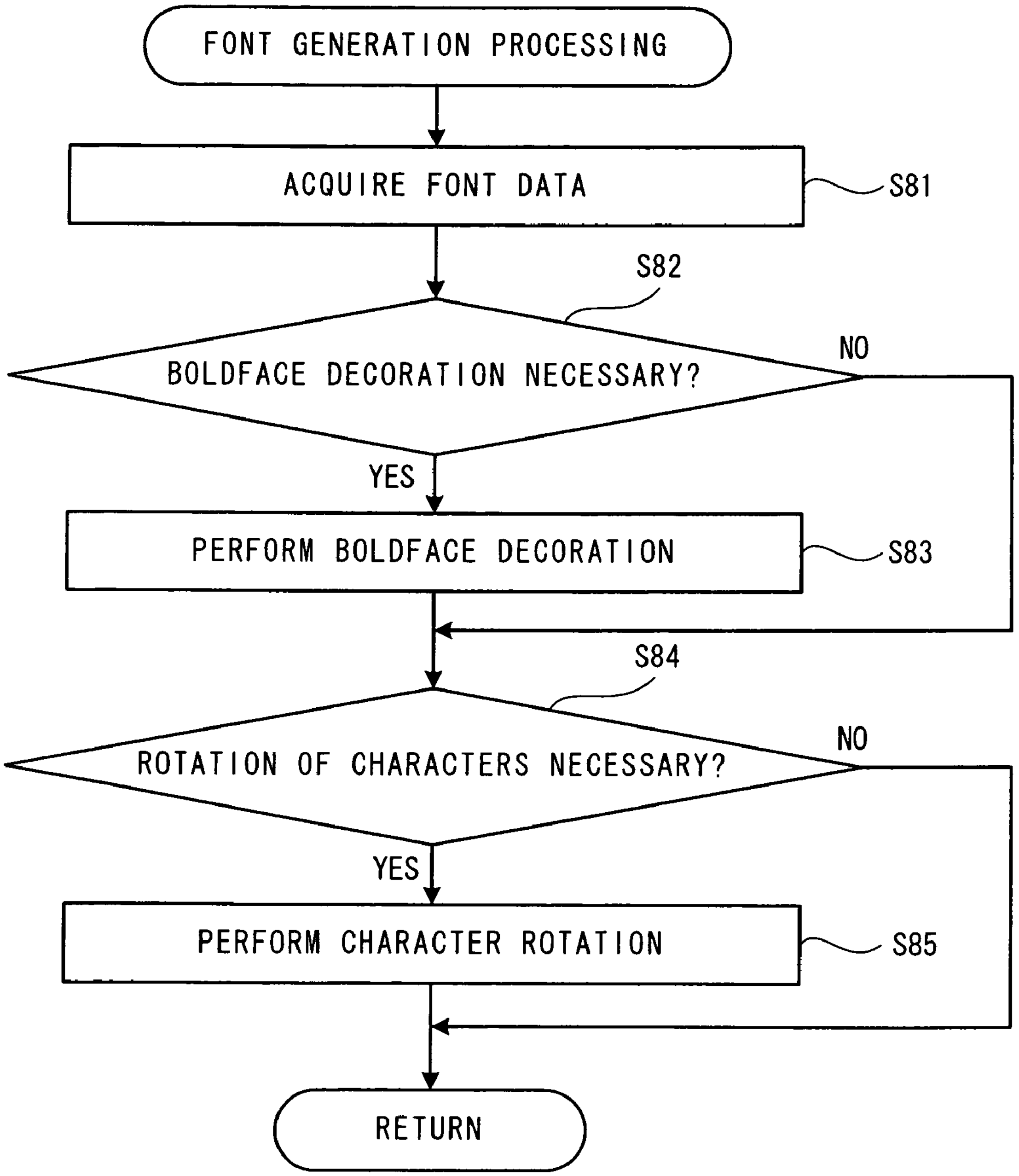
FIG. 15 is a flowchart of font generation processing performed in the first-line processing and the second-line processing.

As shown in FIG. 15, in the font generation processing, font data is acquired based on the character code acquired from the CG data storage area 122 of the ROM 12 at step S46 and the font size specified by the character attributes of the decorative label format selected at step S1. The acquired font data is stored in the first font storage area 138 (S81). If boldface decoration is necessary in the selected decorative label format (YES at S82), the font data stored in the first font storage area 138 is subjected to boldface decoration (S83). If boldface decoration is not necessary (NO at S82), no decoration is applied. If rotation of the characters is necessary in the selected decorative label format (YES at S84), the font data stored in the first storage area 138 is rotated (S85). If rotation of the characters is not necessary (NO at S84), rotation is not performed. Then, the font generation processing is ended, so that the processing returns to the first line processing shown in FIG. 13. As described above, in the font generation processing, the font of the Cnt1*th* character is stored in the first font storage area 138 in a shape corresponding to the decorative label format.

Subsequently, in the first line processing, an initial value 1 is stored as variable tCnt1 that is used to count feed lines of the font stored in the first font storage area 138 (S49). Variable tCnt1 is stored in a storage area (not shown) arranged in the RAM 13. Data of the tCnt1*th* feed line of the font stored in the first font storage area 138 is stored into the print buffer 131 (S51), and the processing returns to the print processing of FIG. 12.

The following processing in the second line processing of step S26 is performed as follows. First, it is determined that the current feed line is a feed line in which the second line's characters are to be printed (YES at S61 in FIG. 14). Subsequently, it is determined whether a font of the second line's characters has already been generated (S62). Immediately after the processing on the feed lines included in the blank space, no font has been generated and stored in the second font storage area 138 yet (NO at S62). Then, it is determined whether variable Cnt2 for counting the characters of the second line's character string is larger than the number of the characters in the second line (S63). Here, because Cnt2 is 1 (Cnt2=1), Cnt2 is not larger than a number of the characters in the second line of eight (NO at S63). Therefore, a character code for the Cnt2*th* character as counted from the first character of the character string in the second line is acquired (S66). Here, because Cnt2 is 1 (Cnt2=1), a character code for the lowercase "y", which is the first character in the second line, is acquired. A value 1 is added to Cnt2 to provide 2 (S67), and the font generation processing is performed (S68 in FIG. 15).

In the font generation processing shown in FIG. 15, like the processing in the first line processing, the font of the Cnt2*th* character is to be stored in the second font storage area 139 in a shape corresponding to the decorative label format. Subsequently, as shown in FIG. 14, in the second line processing, an initial value 1 is stored as variable tCnt2 that is used to count feed lines of the font stored in the second font storage area 139 (S69). Variable tCnt2 is stored in a storage area (not shown) arranged in the RAM 13. Data of the tCnt2*th* line of the font stored in the second font storage area 139 is stored into the print buffer 131 (S71), and the processing returns to the print processing of FIG. 12. By this point, dot data for the first line and the second line have been stored in the print buffer 131. Subsequently, if the format needs highlighting (YES at S27), the characters are highlighted (S28). Otherwise (NO at S27), the characters are not highlighted. Then, one feed line of data is printed based on the information stored in the print buffer 131 (S29).

It is determined whether the printing has been ended based on whether variable Line is larger than the label length (S30). If the printing has not been ended yet (NO at S3), a value 1 is added to variable Line to provide 2 (S31). The processing returns to step S24, and the print buffer is cleared (S24). Then, the first line processing is performed as follows (S25). First, it is determined that the current feed line is a feed line in which the first line's characters are to be printed (YES at S41 in FIG. 13). The font is stored in the first font storage area 138 and so the font has already been generated (YES at S42). Therefore, a value 1 is added to variable tCnt1 for counting feed lines of the font stored in the first font storage area 138 to provide 2 (S50). The data of the tCnt1*th* feed line of the font stored in the first font storage area 138 is stored into the print buffer 131 (S51). Then, the processing returns to the print processing of FIG. 12.

In the print processing, the second line processing will be performed as follows (S25). First, it is determined that the current feed line is a feed line in which the second line's characters are to be printed (YES at S61 in FIG. 14). The font is stored in the second font storage area 139 and so the font has already been generated (YES at S62). Therefore, a value 1 is added to variable tCnt2 for counting feed lines of the font stored in the second font storage area 139 to provide 2 (S70). The data of the tCnt2*th* feed line of the font stored in the second font storage area 139 is stored into the print buffer 131 (S71). Then, the processing returns to the print processing of FIG. 12.

In the print processing, if the format needs highlighting (YES at S27), the characters are highlighted (S28). Otherwise (NO at S27), the characters are not highlighted. Then, one feed line of data is printed based on the information stored in the print buffer 131 (S29). Subsequently, it is determined whether the printing has been ended based on whether variable Line is larger than the label length (S30).

Through the repeated processing of steps S24 through S31, the eighth character in the second line, a lowercase "o", will be processed. In the next second line processing, it will be determined at step S63 of FIG. 14 that Cnt2 is larger than the number of the characters in the second line (YES at S63). In this case, the character code for a space is acquired (S64). Because all the characters of the character string in the second line have been printed, the character code for the space is acquired to give a space for the next printing. Subsequently, to start printing again from the first character of the character string in the second line, an initial value 1 is stored as variable Cnt2 (S65). If the processing is being performed to obtain the print result 101 or 102, the fourth character in the first line, an uppercase "A", is being processed at this point in the first line processing (see FIG. 13).

The processing of steps S24 through S31 is repeated further, and the 15th character in the first line, an uppercase character "O", will be processed. In the next first line processing, it will be determined at step S43 of FIG. 13 that Cnt1 is larger than the number of the characters in the first line (YES at S43). In this case, the character code for a space is acquired (S44). Because all the characters of the character string in the first line have been printed, the character code for the space is acquired to give a space for the next printing. Subsequently, to start printing again from the first character of the character string in the first line, an initial value 1 is stored as variable Cnt1 (S45). If the processing is being performed to obtain the print result 101 or 102, the eighth character in the second line, a lowercase "o", is being processed at this point in the 4th round of the second line processing (see FIG. 14).

Figure 11:
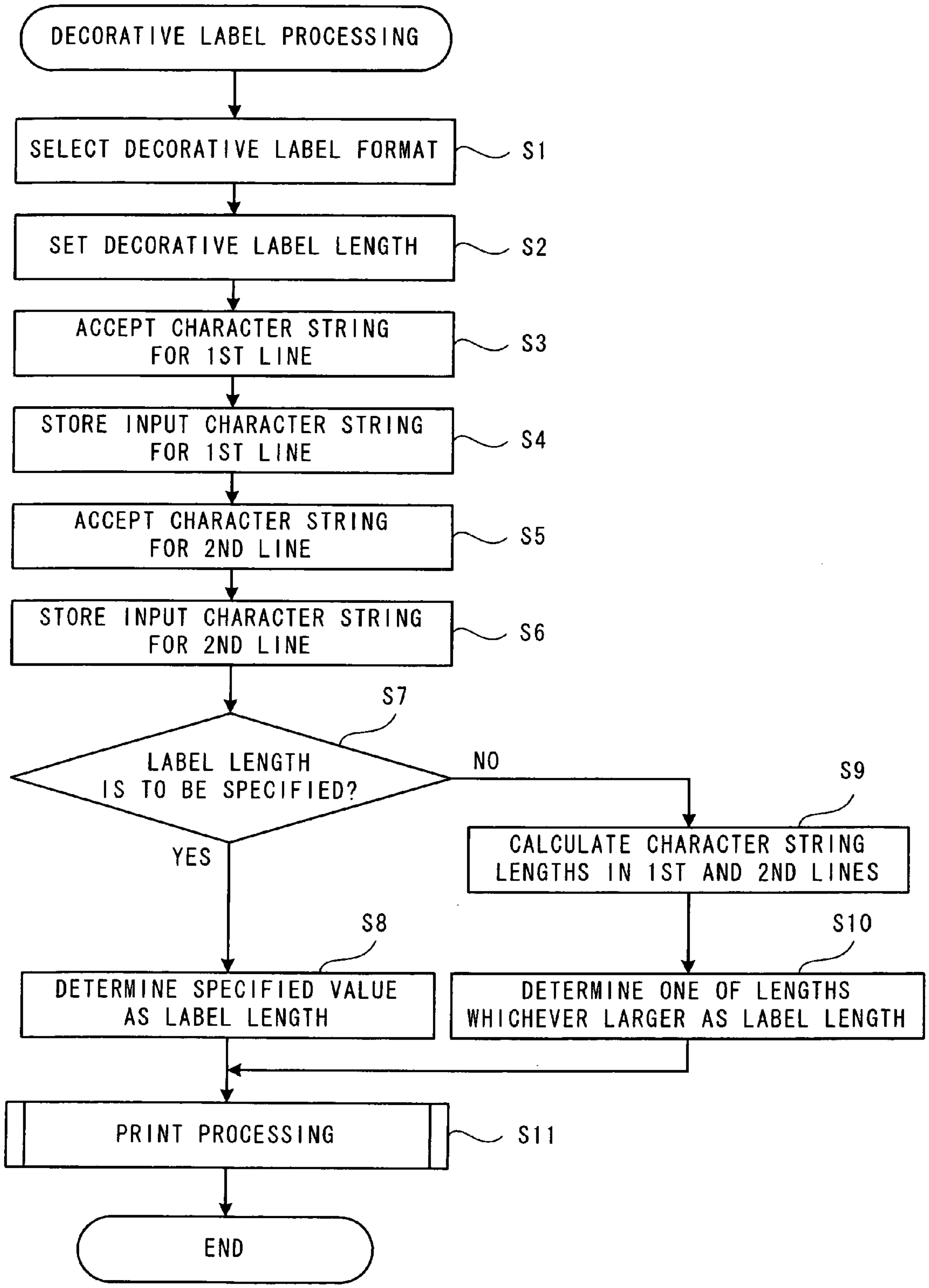
FIG. 11 is a flowchart of decorative label processing.

As the processing of steps S24 through S31 is repeated further, if variable Line for counting feed lines exceeds the label length, it means that printing for the label length has been ended (YES at S30). Accordingly, the print processing shown in FIG. 12 is ended, thus the decorative label processing shown in FIG. 11 is ended.

In such a manner, a font may be generated separately for the first line and the second line and developed in the print buffer. Therefore, even if the print results of the first and second lines have different lengths, character strings in the respective lines can be repeatedly arranged without influencing each other. For example, if the print result of a character string in the first line has a length of 1 cm and the print result of a character string in the second line has a length of 10 cm, a difference in the length of the print results is 9 cm. However, the character string of 1 cm may be repeatedly arranged in the first line without being influenced by the length of 10 cm of the print result of the character string in the second line. Therefore, no wasteful space of 9 cm may be disposed between the repeated character strings in the first line. The user can easily obtain a decorative label in which character strings are repeatedly arranged, through a simple operation of entering respective character strings for the first and second lines and selecting a decorative label format. Therefore, it may be unnecessary for the user to enter the same character string several times, to set character attributes separately, or to adjust the arrangement of the character strings.

Furthermore, by printing such a decorative label, design quality of the label may be enhanced. Accordingly, for example, if the label is used to indicate a name on a stationery product, the indicated character string (name) may have a decorative appearance. As a result, contents of the character string (name) may not be emphasized more than necessary. On the other hand, a viewer of the label can clearly recognize the contents of the character string (name), if necessary.

Because the user can set a label length, the user can obtain a decorative label having a desired length, on which a character strings are repeatedly printed in a well-balanced manner to serve as a beautiful decoration. Further, in a case where character strings are arranged in two lines, the user may set a label length as a print length of either one of the lines whichever has a character string to make a longer print result. Therefore, the user can easily create a label on which each of the complete character strings of the two lines is printed. In this case, in the line having the character string to make a longer print result, one character string may be disposed. On the other hand, in the line having the character string to make a shorter print result, the same character string may be repeatedly disposed. It is thus possible for the user to obtain such a printed label having the length of the character string with a longer print result, with the character string of the other line repeated to match the length and serving as decoration.

The print data generation apparatus of the present disclosure is not limited to the embodiment and can be modified variously without departing from the gist of the present disclosure. The above-described embodiment is an example where the tape printing apparatus 1 having a printing function may generate print data. However, the print data generation apparatus that generates print data need not have an output function. For example, a print data generation program may be stored beforehand in the hard disk drive of a personal computer and the CPU in the personal computer may execute the print data generation program. In such a case, for example, a display device (for example, a display) and an input device (for example, a keyboard) may be connected to the personal computer so that various inputs from the user may be received through the input device. Then, the personal computer serving as a print data generation apparatus may generate print data. This may hold true with an apparatus such as a notebook-type personal computer, in which the display device and the input device are integrated into one apparatus.

Further, in the embodiment, only a two-line decorative label format is described. The number of lines in the decorative format, however, may be three or more. In such a case, processing corresponding to the first line processing and the second line processing may be performed on the respective lines. In this case, it may also be possible for the user to enter a character string and repeatedly arrange the character string at predetermined intervals for each of a plurality of lines separately. Thus, the character string may be repeatedly arranged in each line in a well-balanced manner, without being influenced by the lengths of the respective character strings or the lengths of the print results when the respective character strings are printed in other lines. Therefore, by printing the character strings based on the generated print data, such print results can be obtained that the character strings may serve as a beautiful decoration. Further, the character string may be repeatedly arranged in each line until the length of the repeated character string reaches a length of a line that has the character string to make the longest print result. Therefore, only one character string may be disposed in the line that has the longest print result, while the other character strings may be disposed repeatedly in the other lines, respectively. Therefore, it maybe possible for the user to obtain a printed label having the length of the line having the character string with the longest print result, with the other character strings in the other lines serving as a decoration.

What is claimed is:

1. A print data generation apparatus that generates print data to be used for printing a print-result including a plurality of lines on a tape-shaped print medium, comprising:

an entry accepting device that accepts entries of a plurality of character strings to be printed on the print medium, each entry being separately accepted for each of the plurality of lines extending in a length direction of the print medium;

a storage device that stores the plurality of character strings accepted by the entry accepting device, each of the plurality of character strings being stored for each of the plurality of lines; and a print data generation device that generates the print data in which each of the plurality of character strings stored in the storage device is repeated so that each of the character strings is printed in a predetermined character size and spacing for each of the plurality of lines until each of the plurality of lines in the print-result reaches a common predetermined length.

2. The print data generation apparatus according to claim 1, wherein the predetermined length is the largest among lengths that are given in a case where the plurality of character strings input through the input device are respectively printed in the predetermined character size defined for each of the plurality of lines.

3. The print data generation apparatus according to claim 1, further comprising a specification device that specifies a length of the print-result, wherein the predetermined length is the length specified by the specification device.

4. A non-transitory computer-readable medium storing a print data generation program that comprises instructions to cause a computer to execute the steps of:

accepting entry of a plurality of character strings to be printed in a plurality of lines on a tape-shaped print medium, each entry being separately accepted for each of the plurality of lines extending in a length direction of the print medium;

storing each of the plurality of character strings for each of the plurality of lines; and generating print data in which each of the plurality of character strings is repeated so that each of the character strings is printed in a predetermined character size and spacing for each of the plurality of lines until each of the plurality of lines in a print-result reaches a common predetermined length.

5. The non-transitory computer-readable medium according to claim 4, wherein the predetermined length is the largest among lengths that are given in a case where the plurality of character strings are respectively printed in the predetermined character size defined for each of the plurality of lines.

6. The non-transitory computer-readable medium according to claim 4, wherein:

the print data generation program further comprises instructions to cause the computer to execute the step of accepting a specification of a length of the print-result; and the predetermined length is the specified length.

* * * * *